March 29, 1932.  H. MOORE ET AL  1,851,127
METHOD OF MAKING PIPE PLUGS
Filed Aug. 2, 1930
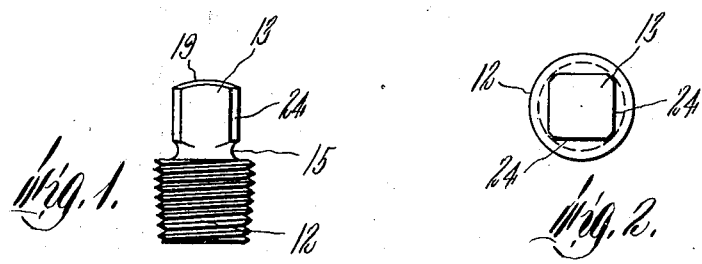
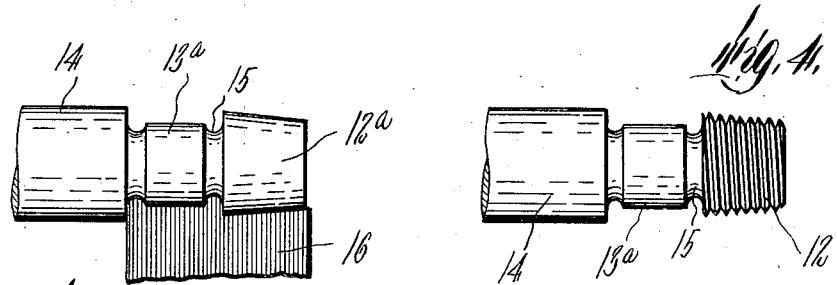
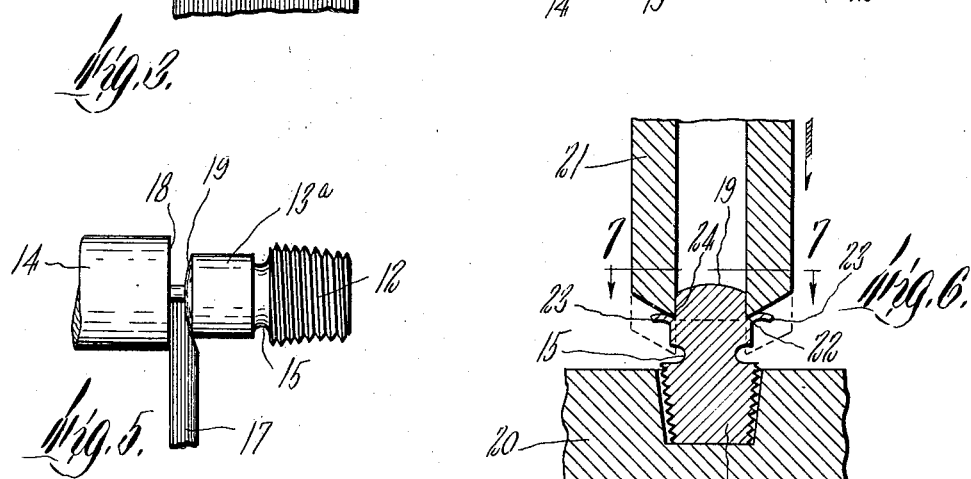
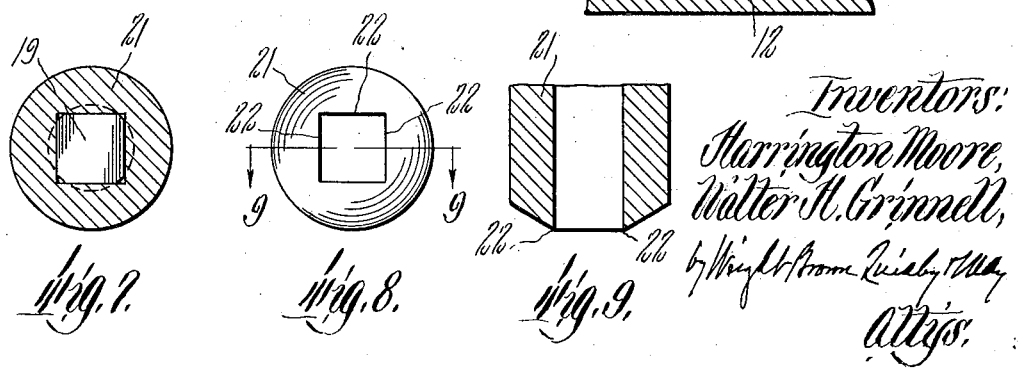

Patented Mar. 29, 1932

1,851,127

UNITED STATES PATENT OFFICE

HARRINGTON MOORE, OF MEDFORD, AND WALTER H. GRINNELL, OF DANVERS, MASSACHUSETTS

METHOD OF MAKING PIPE PLUGS

Application filed August 2, 1930. Serial No. 472,546.

This invention relates to an externally screw-threaded plug adapted to be turned by a wrench and engaged with an internal screw-thread to close an orifice or passage such as the bore of a pipe, a plug of this character being known as a pipe plug, and including a cylindrical externally threaded body portion and a polygonal shank portion coaxial with the body portion and adapted to be engaged by a wrench.

The object of the invention is to reduce the expense of making the polygonal shank portion of a pipe plug.

Of the accompanying drawings forming a part of this specification,—

Figure 1 is a side view of a pipe plug made in accordance with the invention.

Figure 2 is an end view of the same.

Figure 3 shows a part of a cylindrical metal rod and a shaping cutter acting thereon to provide the rod with a reduced portion including blanks for the body and shank of the completed plug.

Figure 4 shows the rod shown by Figure 3, after the body blank is threaded to complete the plug body.

Figure 5 illustrates the cutting-off operation which severs the reduced portion from the rod and forms the end face of the shank blank.

Figure 6 shows the severed reduced portion and illustrates the operation of planing the shank blank to convert it into a polygonal shank.

Figure 7 is a section on line 7—7 of Figure 6.

Figure 8 is an end view of the planing tool or broach shown by Figures 6 and 7.

Figure 9 is a section on line 9—9 of Figure 8.

The same reference characters indicate the same parts in all of the figures.

The screw plug shown by Figures 1 and 2, includes an externally threaded body portion 12, and a polygonal shank portion 13 coaxial therewith.

In making the plug we first reduce the diameter of an end portion of a cylindrical rod 14, to form thereon a blank 12a for the body portion 12, a cylindrical blank 13a for the shank portion 13, and a peripheral groove 15 between said blanks.

The reducing operation is preferably performed by a shaping cutter 16, constituting an element of an automatic screw machine to which the rod is supplied. A screw thread is formed on the body blank 12a by any suitable means, said blank being thus converted into a plug body 12. The reduced portion is then severed from the rod by a cutting-off tool 17, which forms a flat end face 18 on the rod, and a preferably convex end face 19 on the shank blank. Figure 5 shows the position of the tool 17 before the severing operation is completed, and Figure 6 shows the completed end face 19.

The now partly completed plug is next placed in a holder 20 and the shank blank is progressively planed by a planing cutter or broach 21, having cutting edges 22, preferably four in number, as shown by Figures 7 and 8.

The broach is moved in the direction of the arrow in Figure 6, and its edges 22 remove chips 23 from the shank blank in such manner as to complete the shank, by forming a plurality of wrench-engaging faces 24 thereon.

The depth of the groove 15 is such that its bottom has a diameter less than that of the blanks 12a and 13a, one side of the grooves forming a shoulder at the inner end of the shank blank. The broach is so formed that the thickness of the chips 23 is less than the width of the shoulder on the shank blank, so that the cutting edges 22 in completing the cut, pass through said shoulder and into the groove as indicated by dotted lines in Figure 6. The faces 24 intersect said shoulder, so that the chips 22 are entirely detached. The planing operation therefore leaves the plug in a finished condition.

It will now be seen that the faces 24 are formed simultaneously, or by a single planing operation instead of being formed separately, or by a plurality of operations as heretofore, so that the cost of manufacture is materially reduced and the faces 24 have clearly defined inner ends.

We claim:

The method of making a pipe plug having a threaded body and a wrench-engaging shank, said method consisting in reducing the diameter of a portion of a cylindrical rod to form thereon a body blank, a cylindrical shank blank, and a peripheral groove between said blanks, the bottom of the groove having a diameter less than that of said blanks, one side of the groove forming a shoulder at the inner end of the shank blank, threading the periphery of the body blank, severing the reduced rod portion from the rod and at the same time forming an outer end face on the shank blank, and progressively planing the shank blank from said outer end face to and through the said shoulder to convert said blank into a polygonal shank, the faces of which intersect said shoulder, so that the planing operation leaves the plug in a finished condition.

In testimony whereof we have affixed our signatures.

HARRINGTON MOORE.
WALTER H. GRINNELL.